United States Patent [19]

O'Connell et al.

[11] Patent Number: 5,382,278
[45] Date of Patent: Jan. 17, 1995

[54] PRETREATMENT OF CHROMIUM-BEARING METAL SCRAP TO REMOVE CHROMIUM

[75] Inventors: Gary J. O'Connell; David G. Tisdale, both of Sudbury, Canada

[73] Assignee: Falconbridge Ltd., Toronto, Canada

[21] Appl. No.: 112,064

[22] Filed: Aug. 26, 1993

Related U.S. Application Data

[63] Continuation-in-part of Ser. No. 957,132, Oct. 7, 1992, Pat. No. 5,240,496.

[30] Foreign Application Priority Data

Jun. 16, 1992 [CA] Canada .................................. 2071366

[51] Int. Cl.$^6$ ............................................. C22B 23/06
[52] U.S. Cl. ...................................................... 75/626
[58] Field of Search ............................................ 75/626

[56] References Cited

U.S. PATENT DOCUMENTS 3,158,464 11/1964 Chynoweth ............................. 75/51
4,466,826 8/1984 Vartiainen ............................. 75/626

OTHER PUBLICATIONS

Kenworthy et al., Experimental Extraction of Strategic Components From S-816 Alloy Scrap, Rpt. of Invest. 5786, Br. of Mines, U.S. Dept. of Int., Nov. 1959.
Kusik et al., Pyrometallurgical Recovery of Chromium From Scrap Metals: Laboratory Studies, Rpt. of Invest. 8571, Br. of Mines, U.S. Dept. of Int., Oct. 1981.

*Primary Examiner*—Peter D. Rosenberg
*Attorney, Agent, or Firm*—Keck, Mahin & Cate

[57] ABSTRACT

A process for protreating chromium-beating metal scrap comprises charging the chromium-bearing metal scrap with an iron oxide-bearing slag into a pyrometallurgical furnace, heating and melting the charge, and maintaining the charge molten at a temperature of at least 1550° C. for a predetermined time period to allow an iron oxide/chromium exchange reaction to take place oxidizing and removing chromium to the sing phase while reducing iron to the metal phase to form an alloy product containing Fe along with the Ni and/or Co, and removing the alloy product for further processing for recovery of metal values.

13 Claims, 1 Drawing Sheet

PRETREATMENT OF CHROMIUM-BEARING METAL SCRAP TO REMOVE CHROMIUM

CROSS-REFERENCE

This is a continuation-in-part of U.S. Ser. No. 07/957,132 filed Oct. 7, 1992, now U.S. Pat. No. 5,240,496.

This invention relates to a process for removal of chromium from metal ahoy scraps containing substantial amounts of Co and/or Ni along with Cr. In particular, it relates to scraps derived from Ni and Co based superalloys that contain Cr., Co and/or Ni and possibly Fe as the principal constituents. Other elements typically present in lesser amounts include (not exclusively) any or all of the following: Mo, W, Nb, Mn, Ti, Al, Cu, Ta, V, Si, C. The alloy scraps in question may be in many forms including (not exclusively) grindings, turnings, catalysts, spills, off-spec. alloys, mixed premelted metal scrap in ingot form, etc. This material may be further contaminated with oil, moisture, grinding debris, or other metals. The exacting specifications for superalloys render this material unsuitable for remelting alone. Some refining is necessary to recover value from such scrap.

Treatment of superalloy scrap for recovery of its metal values has been investigated previously. Much of the work in this area has been done by the Bureau of Mines, U.S. Department of the Interior. They have investigated hydrometallurgical methods of treating the scrap as well as pyrometallurgical routes as disclosed in the following publications: i) Kenworthy, H., V. A. Nieberlein, and A. G. Starliper; Experimental Extraction of Strategic Components from S816 Alloy Scrap, Report of Investigations 5786, Bureau of Mines, U.S. Department of the Interior, Nov. 1959. ii) Kusik, C. L., K. Parameswaran, D. J. Kinneberg, and H. V. Makar; Pyrometallurgical Recovery of Chromium from Scrap Metals: Laboratory Studies, Report of Investigations 857 1, Bureau of Mines, U.S. Department of the Interior. Oct. 1981.

The hydrometallurgical processes that have been reported (Kenworthy et al. above) involve leaching superalloy scrap in order to dissolve its metal values, followed by chemical purification and/or metals recovery by well-known methods. Although pretreatment before leaching (ex. calcination can be used to increase leaching rates, these methods are complex and only successful with fine scrap material such as grindings or atomized metal.

The pyrometallurgical methods for Cr removal from superalloy scrap that have been reported (Kusik et al. above) involve oxidation of Cr from the metal using gaseous oxygen or solid NiO as the oxidant. The Cr oxide formed is removed to a viscous lime-silicate slag phase. The remaining Ni-Co alloy is then removed from the treatment vessel leaving a viscous or semi-solid Cr bearing slag that is then reduced in order to recover the Cr as ferrochromium. Investigators have demonstrated the chemistry, for both selective Cr oxidation as well as Cr reduction from a Cr bearing slag into a metal phase. However, the ability to produce a fluid slag as well as to accomplish good slag-metal separation with high recoveries of Ni and Co to the first metal product, has not been demonstrated previously. Furthermore, using gaseous oxidant requires additional equipment and can produce extremely high temperatures due to the strongly exothermic nature of Cr oxidation. Using solid NiO as oxidant would be subject to its cost and availability.

A multistep pyrometallurgical princess for the selective oxidation of metals from superalloy scrap has been patented by O. Vartiainen (U.S. Pat. No. 4,466,826). This process involves repeated oxidizing and slag removal steps to gradually remove Cr, W, Mo and other minor elements from a metal melt. The oxidizing agents employed include gaseous oxygen and solid hematite ($Fe_2O_3$). A basic lime-silicate slag is used to dissolve and remove the $Cr_2O_3$ that is formed. With respect to Cr removal by oxidation, the main difference between this process and that reported by Kusik et at. is that a basic lime-silicate slag ($CaO/SiO_2=1.5-2.5$) is used whereas in the latter, an acid lime-silicate slag ($CaO/SiO_2=0.5$) is employed. The problems with both of these processes are similar in that a fluid high Cr slag is difficult to obtain simultaneously with very high Ni and Co recoveries to metal.

The Ni and Co contained in this superalloy scrap are valuable. It is conventional practice to use Cr being materials as secondary feeds for existing primary nickel smelters. By introducing this scrap at various points in the smelting process, the Ni and Co values can be recovered while the Cr is rejected to a waste slag. However, the low solubility of chromium oxide in non-ferrous smelting slags such as fayalite-based .slags at conventional matte smelting temperatures of 1200°–1300° C. limits the amount of Cr-bearing material which can be treated in this manner. This is because Cr oxide and compounds containing Cr oxide precipitate in the various pyrometallurgical vessels, causing operating problems. Chromium bearing precipitates can cause increased slag viscosity leading to higher slag losses. Bottom buildup of chromite can form, occupying furnace volume and disturbing bath levels. A mushy interphase layer can also form between slag and matte which impedes both mass and heat transfer. It is therefore desired to provide a process in which Cr bearing Ni and Co based superalloy scraps could be pretreated for Cr removal prior to this material being used as a secondary feed for a primary nickel smelter. Such a pretreatment process would need to be able to treat scrap in a wide variety of forms, while displaying very high Ni and Co recoveries to metal at high Cr removal ratios.

SUMMARY OF THE INVENTION

It is the object of the present invention to provide a process by which chromium can be conveniently and inexpensively removed from chromium bearing metal scrap containing nickel and/or cobalt.

The process in accordance with the present invention comprises the steps of charging chromium bearing metal scrap containing nickel and/or cobalt with iron-oxide bearing slag into a pyrometallurgical furnace, heating and melting the charge, and maintaining the charge molten at a temperature of at least 1550° C. for a predetermined interval of time to allow an iron oxide/chromium exchange reaction to take place oxidizing and removing chromium to the slag phase while reducing iron to the metal phase to form an alloy product containing Fe along with the Ni and/or Co, and removing the ahoy product for further processing for recovery of metal values. Further processing of the alloy product for recovery of Ni and Co may take place within an existing primary nickel smelter.

The iron oxide-bearing slag may be obtained from an existing primary smelter, and may be charged to the process described above in either solid or molten forms. Fayalite is an example of iron oxide-bearing slag.

Alumina may also be charged to the furnace as a flux, in a mounts which would produce a final slag with an alumina content ranging from 0 to 50 wt. % $Al_2O_3$. Alumina-bearing spent catalyst or catalyst residue material containing Ni, Co, or other valuable memos may be used as the alumina source for the slag phase. Nickel and cobalt contained in the catalyst material are recovered to the Ni-Co-Fe alloy product.

BRIEF DESCRIPTION OF THE DRAWING

The invention will now be disclosed, by way of example, with reference to a preferred mode of carrying it out which also refers to a drawing showing curves of standard free energies of formation of various oxides from the corresponding elements as a function of temperature (see A. Muan, page 358 in "Electric Furnace Steelmaking" Iron and Steel Society, 1985).

DESCRIPTION OF A PREFERRED EMBODIMENT

Figure 1:
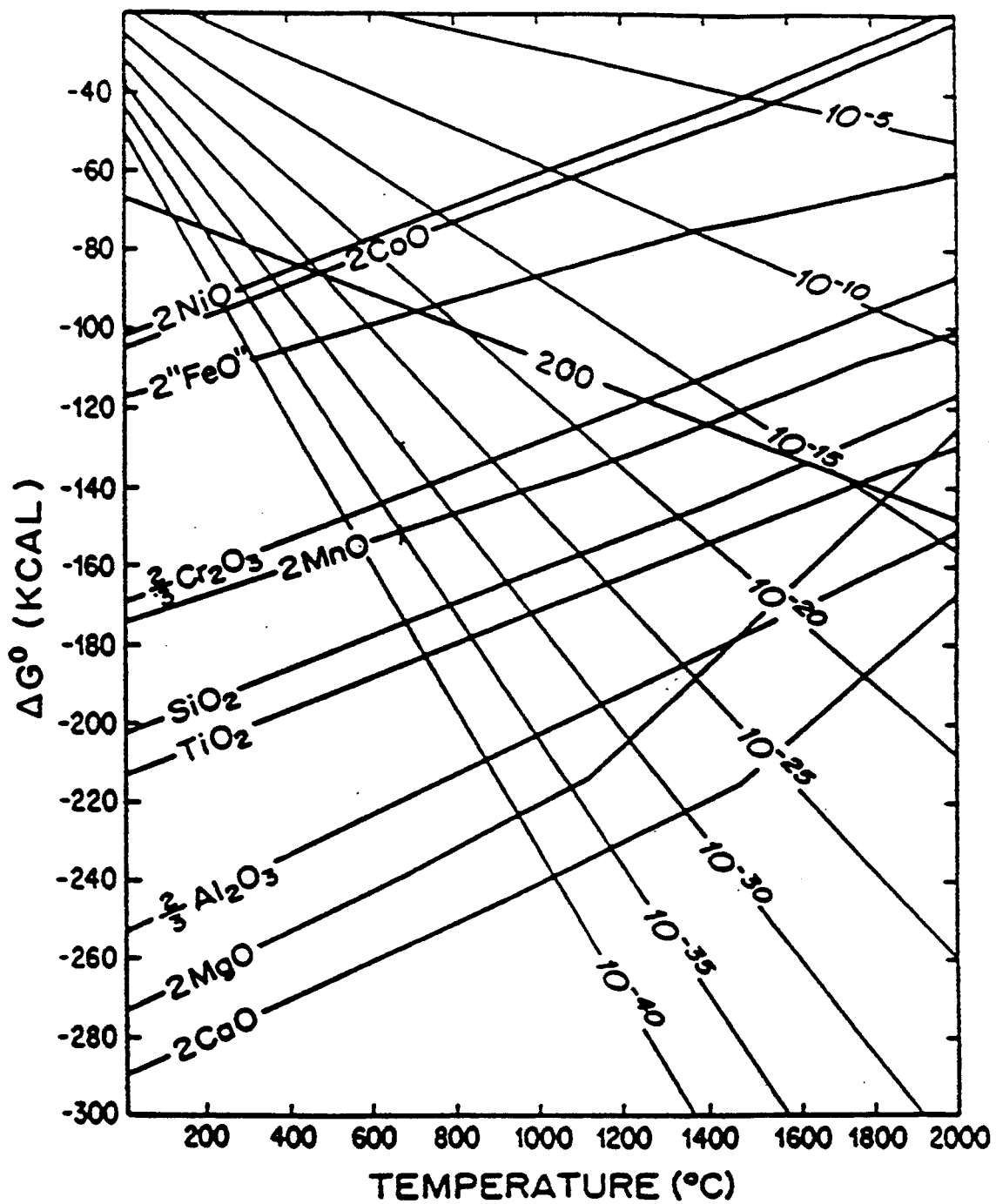

The pretreatment process begins with charging superalloy scrap, iron-oxide bearing slag such as fayalite slag, and optionally alumina into a pyrometallurgical furnace. The charge is heated to a temperature of approximately 1550°–1850° C., and this temperature is maintained for a predetermined time to allow oxidation of chromium contained in the metal. The iron oxide in the slag functions as the oxidant for chromium removal from the metal. Chromium is thus transferred from metal to slag, while iron is transferred from slag to metal. Iron-oxide bearing slag serves the dual purpose of oxidant and fluxing agent, and no additional source of oxygen is needed.

The thermodynamic basis for the metallothermic reaction:

$$Cr_{alloy} + x\, FeO_{slag} \longrightarrow x\, Fe_{alloy} + CrO_x,\, slag \quad (1)$$

is illustrated in FIG. 1. From the data in FIG. 1, the value for the standard free energy change for reaction (1) is calculated to be roughly −22.5 kcal at 1600° C., x=1.5, indicating that the reaction proceeds spontaneously left to right. This FIGURE also illustrates that nickel and cobalt oxidation (and resulting loss to slag) are precluded while FeO is being reduced. This is because FeO, being more stable than NiO or CoO but less stable than Cr oxide, will selectively oxidize Cr only from a Ni-Co-Cr ahoy and will not oxidize Ni or Co.

The use of Fe oxide as opposed to gaseous oxygen as the reagent for Cr oxidation and removal from Ni-Co-Cr alloys is therefore beneficial in terms of selectivity, minimizing Ni and Co losses to the slag. Using gaseous oxidant also requires additional equipment and can produce extremely high temperatures due to the strongly exothermic nature of Cr oxidation. This heat effect is not as pronounced when Fe oxide is used since a large portion of the heat released by Cr oxidation is consumed by endothermic Fe oxide reduction.

The use of iron oxide-bearing slags such as fayalite slag (2FeO.SiO2) as oxidant for Cr is novel. It is well known that Cr oxide is a neutral, high melting point refractory oxide which is not highly soluble in either acid or basic slags. Iron oxide-bearing slags serve the dual role of oxidant for Cr as well as flux for the Cr oxide produced. Therefore while maintaining the advantages of Fe oxide over gaseous oxygen as described above, the use of iron-oxide-bearing slag enables shags containing up to 15 wt. % Cr to be formed which are liquid and fluid. The concentration of iron oxide in the slag is not critical. It will however become obvious to those of ordinary skill in the art that a higher concentration of iron oxide translates into a smaller amount of slag to be introduced in the furnace.

Superalloy scrap material as previously described is processed together with iron oxide-bearing slag and optionally alumina bearing material in the overall ratio of approximately 1-2:1 oxides:metal by weight. The exact slag:metal weight ratio overall depends on the Cr content of the metal scrap and the target Cr contents for the final slag and product metal. For example, for alloy scrap containing initially 20% Cr and final slag containing 10% Cr, a 2:1 slag:metal ratio yields a final metal nearly Cr free. The final overall slag:metal weight ratio is not significantly different from the initial ratio of oxides:metal because chromium transfer to the slag is balanced by iron transfer to the metal.

The feed materials (alloy scrap + oxidative flux) may be added to the pyrometallurgical furnace together or separately. Furnace charging, heating and melting can be performed in any of the following sequences: a) add total charge, then heat and melt, b) add metal first, heat and melt, then add oxidative flux, c) add oxidative flux first in solid or molten form, heat and melt if necessary, then add alloy scrap. The process can be operated in any of the following modes: single-stage batch, multistage batch, semi-continuous, or continuous.

Alumina or alumina-beating material may or may not be used as an additional feed to the process. The presence of alumina as a slag constituent allows alumina-based refractory to be employed as a furnace lining, resisting attack by the molten slag. Alumina also can provide additional fluxing so that product slags display adequate fluidity.

A potential source for the alumina in slag is spent catalyst waste product from the petroleum industry, or other alumina-bearing spent catalysts. These materials can contain substantial amounts of Ni and/or Co which are valuable metals that can be recovered from this material in an existing primary nickel smelter. The use of this material as a secondary feed for primary nickel smelters is limited however by the solubility of alumina in non-ferrous smelting slags at conventional matte smelting temperatures of 1200°–1300° C. This solubility limit is much higher at the temperatures involved in the present process. When this spent catalyst is used as a flux in the superalloy pretreatment process described herein, the Ni and Co oxides associated with the catalyst undergo an exchange reaction with Cr in the metal, oxidizing and removing Cr to the slag phase while the Ni and Co are reduced and report to the metal phase. The superalloy scrap pretreatment process therefore also represents an additional means of recovering metal values from this material.

The following examples are provided to illustrate the invention rather than limit its scope.

EXAMPLE 1

A charge consisting of 44 g of alloy scrap, 4 g of Fe, 60 g of fayalite slag and 40 g of pure alumina was mixed and melted in an induction furnace under an argon atmosphere. After 1.5 hours at 1600° C., the charge was allowed to furnace cool. A metal button of 50 g and a homogenous slag phase were obtained with the following chemical analysis:

|  | Ni | Co | Cr | Fe | S | W | Mo | SiO$_2$ | Al$_2$O$_3$ |
|---|---|---|---|---|---|---|---|---|---|
| Initial Alloy | 16.5 | 41.1 | 22.7 | 7.9 |  | 5.6 | 3.1 |  |  |
| Final Alloy | 14.5 | 34.7 | 1.1 | 41.1 | 1.1 | 5.5 | 2.1 |  |  |
| Initial Fayalite slag | 0.14 | 0.08 | 0.15 | 36.2 | 1.1 |  |  | 39 | 6.2 |
| Final slag | 0.05 | 0.31 | 9.9 | 8.8 | 0.1 |  |  | 25.1 | 47.5 |

EXAMPLE 2

A charge consisting of 6.1 kg of alloy scrap, 4.7 kg of fayalite slag, and 10.6 kg alumina-bearing spent catalyst was mixed and melted in an electric arc furnace under ambient atmosphere. Charge was added over a period of 2 hours during which melting took place. After 30 minutes at about 1700° C., the melt was poured into a crucible and allowed to cool. A metal button of 5.3 kg and a homogeneous slag phase were obtained with the following chemical analysis:

|  | Ni | Co | Cr | Fe | S | W | SiO$_2$ | Al$_2$O$_3$ |
|---|---|---|---|---|---|---|---|---|
| Initial Alloy | 20.5 | 27.5 | 24.2 | 11.1 |  | 8.7 |  |  |
| Final Alloy | 23.2 | 24.3 | 4.2 | 33.2 | 3.7 | 7.0 |  |  |
| Initial Fayalite slag | 0.12 | 0.07 | 0.15 | 34.8 | 1.1 |  | 37 | 4.6 |
| Initial catalyst | 5.95 | 0.93 | 0.3 | 1.6 | 3.1 |  | 11.04 | 43 |
| Final slag | 0.25 | 0.20 | 7.9 | 1.8 | 0.1 |  | 23.2 | 40.7 |

EXAMPLE 3

A charge consisting of 355 lbs. alloy scrap in the form of pigs was melted down in an electric arc furnace. Following metal meltdown, approximately 115 lbs. each fayalite slag and alumina bearing spent catalyst was mixed and charged to the furnace over a 10–15 min. period. Electrical power was applied in order to obtain a molten, fluid slag. After a waiting period of roughly 15 min., this slag was skimmed from the furnace at a temperature of roughly 1650°–1750° C. This fluxing/-skimming procedure was then repeated two more times. 320 lbs. metal product was then poured out from the furnace. Chemical analysis of furnace products was as follows:

|  | Ni | Co | Cr | Fe | S | W | Mo | SiO$_2$ | Al$_2$O$_3$ |
|---|---|---|---|---|---|---|---|---|---|
| Initial Alloy | 31.9 | 30.1 | 17.1 | 9.9 |  | 3.7 | 2.2 |  |  |
| Alloy after skim #1 | 32.2 | 31.4 | 10.5 | 18.7 | 0.7 | 3.67 | 2.0 |  |  |
| Alloy after skim #2 | 33.3 | 31.0 | 3.9 | 25.3 | 1.4 | 3.49 | 2.4 |  |  |
| Alloy after skim #3 *Final Alloy | 34.0 | 30.9 | 1.6 | 27.4 | 1.5 | 3.05 | 2.5 |  |  |
| Initial Fayalite slag | 0.12 | 0.07 | 0.15 | 34.8 |  |  |  | 37 | 8.1 |
| Initial Catalyst | 5.14 | 1.04 | 0.24 | 2.1 |  |  |  | 11.8 | 42.6 |
| Skim #1 slag | 1.05 | 1.01 | 10.5 | 8.0 | 0.3 | 0.3 | 0.2 | 26.3 | 27.5 |
| Skim #2 slag | 0.65 | 1.06 | 13.2 | 8.2 | 0.2 | 0.5 | 0.2 | 25.8 | 26.4 |
| Skim #3 slag | 1.72 | 1.24 | 4.2 | 17.6 |  | 0.7 | 0.4 | 24.9 | 26.5 |

EXAMPLE 4

A charge consisting of 350 lbs. alloy scrap in the form of pigs was melted down in an electric arc furnace. Following metal meltdown, approximately 200 lbs. of fayalite slag was charged to the furnace over a 5 min. period. Electrical power was applied on order to obtain a molten, fluid slag. After a waiting period of roughly 20 min., this slag was skimmed from the furnace at a temperature of roughly 1650°–1750° C. This fluxing/-skimming procedure was then repeated one more time. 376 lbs. metal product was then poured out from the furnace. Chemical analysis of furnace products was as follows:

|  | Ni | Co | Cr | Fe | S | W | SiO$_2$ | Al$_2$O$_3$ |
|---|---|---|---|---|---|---|---|---|
| Initial Alloy | 29.6 | 30.7 | 17.9 | 10.9 |  | 3.7 |  |  |
| Final Alloy | 29.4 | 27.1 | 4.0 | 32.5 | .72 | 3.4 |  |  |
| Initial Fayalite slag | 0.14 | 0.08 | 0.15 | 36.5 | 1.0 |  | 38.6 | 8.1 |
| Skim #1 slag | 0.85 | 0.87 | 14.9 | 7 | 0.14 | 0.03 | 39.9 | 22.7 |
| Skim #2 slag | 0.30 | 0.58 | 15.1 | 13.8 | 0.28 | 0.09 | 44.1 | 12.4 |

EXAMPLE 5

A charge consisting of 4.05 kg of alloy scrap and 12 kg of iron oxide-bearing slag was melted in an electric arc furnace under ambient atmosphere. Metal was melted first and then slag was gradually added and melted over a period of about 1 hour. After 30 minutes at about 1600° C., the melt was poured into a crucible and allowed to cool. A metal button of 5.88 kg and a homogeneous slag phase were obtained with the following chemical analysis.

|  | Ni | Co | Cr | Fe | SiO$_2$ | Al$_2$O$_3$ | MgO |
|---|---|---|---|---|---|---|---|
| Initial Alloy | 30.4 | 30.2 | 16.4 | 10.6 |  |  |  |
| Final Alloy | 22.7 | 21.9 | 5.2 | 45.9 |  |  |  |
| Initial Feed slag | 0.5 | 0.03 | 0.91 | 18 | 46 | 3 | 27.5 |
| Final slag | 0.02 | 0.02 | 4.98 | 3 | 53.3 | 4.8 | 28.7 |

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for treating chromium-bearing metal scrap containing at least one member selected from the group consisting of nickel and cobalt, comprising:
   a) charging the chromium-bearing metal scrap with an iron oxide-bearing slag into a pyrometallurgical furnace,
   b) heating anti melting the charge, and maintaining the charge molten at a temperature of at least 1550° C. for a time period sufficient to permit the iron oxide bearing slag to act as an oxidant and flux for chromium, thus allowing an iron oxide/chromium exchange reaction to take place oxidizing and removing chromium to the slag phase while reducing iron to the metal phase to form an alloy product containing Fe and at least one member selected from the group consisting of Ni and Co, and
   c) removing the alloy product for further processing for recovery of metal values.

2. A process according to claim 1 in which the alloy product is processed further in an existing smelter or refinery for recovery of metal values.

3. A process according to claim 1 in which the temperature that molten slag and metal are held at ranges from 1550°–1850° C.

4. A process according to claim 1 in which the iron oxide-bearing slag is obtained from an existing primary smelter and is charged to the process in either solid or molten forms.

5. A process according to claim 1 in which alumina is charged to the furnace as a flux in amounts which would produce an alumina content in the final slag ranging from 0 to 50 wt. % alumina.

6. A process according to claim 5 in which alumina-bearing spent catalyst or catalyst residue material, which contains Ni, Co, or other valuable metals, is used as the alumina source for the slag phase.

7. A process according to claim 6 in which the oxidized nickel and cobalt contained in the catalyst material undergo an exchange reaction with Cr in the metal, oxidizing and removing Cr to the slag phase while the valuable metals are reduced and recovered to the alloy product.

8. A process according to claim 1 in which fluid slags are obtained containing up to 15% chromium, with very low contents of at least one dissolved metal selected from the group consisting of Ni and Co.

9. A process according to claim 1 in which the melting operation is carried out in an electric arc furnace.

10. A process according to claim 9 in which Cr is removed from the metal gradually in a multi-stage process, through alternating slag addition and skimming operations.

11. A process according to claim 1 in which the metal charge may contain substantial amounts of Cr and at least one member selected from the group consisting of Ni and Co, and lesser amounts of any or all of the following: Fe, Mo, W, Nb, Mn, Ti, Al, Cu, Ta, V, Si, C.

12. A process according to claim 11 in which the scrap metal may be in a wide variety of forms including grindings, turnings, catalysts, spills, off-spec. alloys, mixed premelted metal scrap in ingot form.

13. A process according to claim 1 in which the charge materials are added together or separately.

* * * * *

UNITED STATES PATENT AND TRADEMARK OFFICE
CERTIFICATE OF CORRECTION

PATENT NO. : 5,382,278                                         Page 1 of 3
DATED      : January 17, 1995
INVENTOR(S): Gary J. O'Connell et al It is certified that error appears in the above-indentified patent and that said Letters Patent is hereby corrected as shown below:

IN THE ABSTRACT:

- line 1,        replace "protreating" with --pretreating--; and
                 replace "beating" with --bearing--;

- line 6,        after "1550°C" delete ".";

- line 8,        replace "sing" with --slag--;

- column 1,     line 10, replace "ahoy" with --alloy--;
                line 13, after "Cr" delete ".";
                line 40, replace "857 1" with --8571--;
                line 47, after "calcination" insert -- ) --;
                line 60, after "chemistry" delete ",";

- column 2,     line  3, replace "princess" with --process--;
                line 13, replace "at." with --al.--;
                line 21, replace "being" with --bearing--;
                line 27, replace ".slags" with --slags--;
                line 29, replace "C." with --C--;
                line 54, after "iron" delete "-";
                line 55, replace "oxide bearing" with
                    --oxide-bearing--;
                line 57, replace "C." with --C--;
                line 63, replace "ahoy" with --alloy--;

UNITED STATES PATENT AND TRADEMARK OFFICE
CERTIFICATE OF CORRECTION

PATENT NO. : 5,382,278
DATED : January 17, 1995
INVENTOR(S) : Gary J. O'Connell et al It is certified that error appears in the above-indentified patent and that said Letters Patent is hereby corrected as shown below:

- column 3,   line  4, replace "a mounts" with --amounts--;
              line  7, replace "memos" with --metals--;
              line 24, replace "iron-oxide bearing" with --iron oxide-bearing--;
              line 27, replace "C." with --C--;
              line 33, replace "Iron-oxide bearing" with --Iron oxide-bearing--;
              line 42, replace "C." with --C--;
              line 49, replace "ahoy" with --alloy--;
              line 68, delete the hyphen between "iron" and "oxide";
              line 68, replace "shags" with --slags--;

- column 4,   line 31, replace "beating" with --bearing--;
              line 65, replace "C." with --C--;

UNITED STATES PATENT AND TRADEMARK OFFICE
CERTIFICATE OF CORRECTION

PATENT NO. : 5,382,278
DATED : January 17, 1995
INVENTOR(S) : Gary J. O'Connell, et al It is certified that error appears in the above-indentified patent and that said Letters Patent is hereby corrected as shown below:

- column 5,    line 20, replace "C." with --C--;

- column 6,    line 17, replace "on" with --in--;
               line 45, replace "C." with --C--;

IN THE CLAIMS:

- column 7,    line 7, replace "anti" with --and--;
               line 9, replace "C." with --C--;

Signed and Sealed this

Eighth Day of August, 1995

Attest:

BRUCE LEHMAN

Attesting Officer    Commissioner of Patents and Trademarks